United States Patent
Warner et al.

(10) Patent No.: US 6,171,734 B1
(45) Date of Patent: Jan. 9, 2001

(54) SECURITY PRINTED DOCUMENT TO PREVENT UNAUTHORIZED COPYING

(75) Inventors: Richard D. Warner, Clinton; John T. Lind, Cranberry Township, both of PA (US)

(73) Assignee: Graphic Arts Technical Foundation, Sewickley, PA (US)

( * ) Notice: Under 35 U.S.C. 154(b), the term of this patent shall be extended for 0 days.

(21) Appl. No.: 09/184,812

(22) Filed: Nov. 2, 1998

Related U.S. Application Data

(63) Continuation-in-part of application No. 08/643,306, filed on May 10, 1996, now Pat. No. 5,830,609.

(51) Int. Cl.$^7$ .................................................. B42D 15/00
(52) U.S. Cl. ............................... 430/10; 430/1; 283/902; 283/83; 283/86; 283/84; 283/93; 101/490; 359/2
(58) Field of Search .................... 430/10, 1, 2; 287/83, 287/84, 93, 902, 86; 359/2; 427/7, 163.4, 287, 288; 101/490

(56) References Cited

U.S. PATENT DOCUMENTS

| | | | |
|---|---|---|---|
| 4,303,307 | 12/1981 | Tureck et al. | 350/276 R |
| 4,420,515 | 12/1983 | Amon et al. | 428/29 |
| 4,552,429 | 1/1985 | Gardner et al. | 283/91 |
| 4,582,346 | 4/1986 | Caprio et al. | 283/94 |
| 4,586,811 | 5/1986 | Kubo et al. | 355/201 |

(List continued on next page.)

FOREIGN PATENT DOCUMENTS

| | | | |
|---|---|---|---|
| 1574614 | 9/1980 | (GB) | 283/902 |
| 63-282702 | * 11/1988 | (JP) . | |
| 5-099695 | * 4/1993 | (JP) . | |
| 6-079992 | 3/1994 | (JP) | 283/902 |

OTHER PUBLICATIONS

Elliott, D.J., "Integrated Circuit Fabrication Technology", McGraw–Hill, pp. 116–125, 1982.*

Van Renesse, R. L., "Ordering the Order—A Survey of Optical Document Security Features", *SPIE, Holography IX*, San Jose, paper #2406–33, pp. 1–8, Feb. 5–10, 1995.

Chamberlain, Michael R., "Optically Variable Devices and Security Printing", *Management and Technology*, vol. 1, No. 6, pp. 12–15, Dec. 1995.

Stoffel et al., "A Survey of Electronic technologies . . ." IEEE Tnns. Comm. (Dec.1981) vol. Com–29(12) pp. 1948–1975.

Bruce "Document Copy Prevention" IBM Tech. Discl. Bull 18(1) p. 43. (Jun. 1975).

(List continued on next page.)

*Primary Examiner*—Martin Angebrandt
(74) *Attorney, Agent, or Firm*—Price & Adams

(57) ABSTRACT

A paper substrate is laminated with a metalized layer forming a mirrored surface. A partially transparent black diffraction grating is applied by stochastic screening to the mirrored surface. The diffraction grating forms a random pattern from selected geometric shapes. Information, such as alphanumeric indicia or graphics, is printed on the stochastic screen to thus form a reflective diffraction device which is printable in a conventional manner while inhibiting reproduction of the printed information by conventional techniques, including black and white and color photoreproduction and facsimile machines. The partially transparent black stochastic screen forms a diffraction grating on the metalized layer so that when illuminated from the light source of either a specular or diffuse illumination-type photocopier, random interference patterns of light occur at the interface of the metalized surface and the stochastic screen. The diffracted light is not readable by a photocopier drum with the result that the indicia is not legibly reproduced. Thus, the indicia printed on the security document is protected from counterfeiting and unauthorized copying.

17 Claims, 7 Drawing Sheets

U.S. PATENT DOCUMENTS

| | | | |
|---|---|---|---|
| 4,589,686 | 5/1986 | McGrew | 283/85 |
| 4,603,970 | 8/1986 | Aota et al. | 355/133 |
| 4,632,429 | 12/1986 | Gardner et al. | 283/91 |
| 4,703,434 * | 10/1987 | Brunner . | |
| 4,867,481 | 9/1989 | Gundjian | 283/91 |
| 5,087,507 | 2/1992 | Heinzer | 428/195 |
| 5,163,088 | 11/1992 | LoCascio | 379/100 |
| 5,169,722 | 12/1992 | Nakashima | 428/457 |
| 5,171,040 | 12/1992 | Orndorff | 283/93 |
| 5,271,645 | 12/1993 | Wicker | 283/92 |
| 5,290,068 | 3/1994 | Gundjian | 283/67 |
| 5,297,815 | 3/1994 | Anderson et al. | 283/93 |
| 5,301,981 | 4/1994 | Nesis | 283/73 |
| 5,338,067 | 8/1994 | Gundjian | 283/67 |
| 5,350,199 | 9/1994 | Young et al. | 283/91 |
| 5,487,567 | 1/1996 | Volpe | 283/72 |
| 5,830,609 * | 11/1998 | Warner et al. | 430/10 |

OTHER PUBLICATIONS

Willard et al. "Instrumental Methods of Analysis" pp. 43–46, (1981).

Hecht, Eugene; *Optics* 2d ed.; 1988; pp. 430–434.

Sears, Francis W. et al., *University Physics*; 1950; pp. 781–789.

Jenkins et al. "Fundamentals of Optics" pp. 355–373, (1976).

Hecht, E., "Optics" second edition, pp. 430–433, 1987.*

* cited by examiner

30% 2400 dpi film 100X

30% 150 lpi 100X

SECURITY PRINTED DOCUMENT TO PREVENT UNAUTHORIZED COPYING

CROSS REFERENCE TO RELATED APPLICATION

This application is a continuation-in-part of copending application Ser. No. 08/643,306 filed May 10, 1996, now U.S. Pat. No. 5,830,609 entitled "Security Printed Document to Prevent Unauthorized Copying".

BACKGROUND OF THE INVENTION

1. Field of the Invention

This invention relates to method and apparatus for preventing unauthorized copying of original documents by conventional electrostatic photocopiers and, more particularly, to a metalized printable substrate having a screened geometric pattern printed on the substrate to form a diffraction grating for producing a random interference pattern of diffracted light when the substrate is illuminated by a photocopier light source to render a copy of the printed information illegible.

2. Description of the Prior Art

Recent advancements in the development of sophisticated photocopying machines, particularly the color copier, has compromised document security by permitting unauthorized duplication of original documents for the purpose of passing them off as original documents. This problem is particularly acute in the manufacture of forged and counterfeit valuable documents, such as currency and other negotiable instruments. The proliferation of this problem has generated many devices and methods to prevent unauthorized copying, forgery and counterfeiting by security measures that reveal a violation at a glance.

Prior to the development of the color copier, optically invariable devices (OIDs) were effective to deter unauthorized copying and counterfeiting. OIDs use yellow or blue printing which does not reproduce on older black and white photocopiers. However, optically invariable devices have been compromised by the advent of advanced analog and digital color copiers. To counter these measures optically variable devices (OVDs) have been developed and are based on specular reflection (metallic foils), diffraction (holograms, etc.) or interference (thin films, etc.).

Optically invariable devices are generally diffusely reflecting devices which are independent of the angle of illumination and observation. It is generally known that OIDs are copied easily by advanced color copiers and other four color reproduction systems. However, optically variable devices were developed to deter four color copy fraud. OVDs, such as embossed holograms and iridescent devices, include images or patterns which appear to change as the angle of light or vision changes. Overall OVDs are based on either specular reflection (metallic foils), diffraction (holograms, kinegrams, pixelgrams, etc.) or interference (thin films, Bragg structures and liquid crystal).

Security documents which rely on diffuse color printing are printed with the color images by diffuse pigments which are only ordered in the visual millimeter scale. For example, information is printed or typed on paper with color having a reflection spectral response of less than 10% for light with a wavelength below about 600 millimicrons. The color is sufficiently contrasting with the information to enable the information to be read by the human eye when the document is viewed under white light, but the document cannot be successfully copied by an electrostatic photocopier. U.S. Pat. No. 4,522,429 is representative of this type of antiphotocopying paper.

Similarly, U.S. Pat. No. 4,632,429 discloses a document having a portion being capable of transmitting visual light from the rear face to the front face to cause sufficient contrast between the relatively non-translucent information and the transmitted light. The information can be read by the human eye viewing the front face of the document when visible light is transmitted through the document from the rear face to the front face thereof. The front face portion has a color with a sufficiently low reflection spectral response to render the document portion substantially incapable of being photocopied in an information-readable manner.

U.S. Pat. No. 5,169,722 discloses an anticopying composite film on a paper substrate which acts as a mirror when placed upon the platen of a photocopier of the 0/45° type, which utilizes specular illumination rather than diffuse illumination. The resulting copies turn out black and mask the type or print thereon. The anticopying composite film includes a substratum of paper of synthetic resin film, a metallic foil formed on the surface of the substratum, and a colored transparent synthetic resin coating applied to the surface of the metallic foil. With this arrangement, the printing cannot be reproduced when the information is photocopied.

In another arrangement, as disclosed in U.S. Pat. No. 5,290,068, a lacquer is applied to a paper surface coated with a layer of a colorless, color developer. A gloss is added to the surface of the paper and provides specular reflection characteristics that enhance the uncopiability of the final product.

It is also well known to apply a watermark or a continuous tone image to a paper surface. Under light the diffused reflection of the watermark is visible as a negative image because the thick portions of the paper have a higher diffuse reflection than the thin portions. Overall, however, it is recognized that the essential continuous tone properties of the watermark appear to be difficult to communicate, requiring holding the security document against the light in order to view the watermark.

Microtext is a similar approach to creating a security document. Microtext consists of very small lettering, beyond the 300–600 d.p.i. resolution of the usual scanner and color and black and white copiers. One disadvantage of the microtext is that a message consisting of 0.03 mm letters is below the resolving power of human vision and its verification requires a magnifier. It is also known to use fine line security patterns to deter counterfeiting. The fineness of the lines is beyond the resolution of the usual scanner.

Intaglio printing is a well known method for imprinting security images into documents, as disclosed in U.S. Pat. No. 5,487,567. Intaglio printing consists of tactile raised lines of which the ink is transferred to the document under high printing pressures. The latent image consists of a fine intaglio pattern defined by image portions which differ in depth orientation from other elements forming the background. The ability to discern the image portion from the background varies noticeably depending upon the angle of view and the orientation of the document. Under oblique observation, foreground and background separate in contrast because the raised lines of one pattern shield the white paper from view while between the lines of the other pattern the paper remains visible. The intaglio relief is uncopiable so that the copies will entirely lack the optically variable effect.

U.S. Pat. No. 5,301,981 discloses a copy preventing sheet-form screen having indicia printed thereon which is readable when the document is viewed obliquely. The information is unintelligible when copied by the conventional, perpendicularly aligned, phototransferance techniques such as photocopying, offset printing, and facsimile transmission.

Screen angle modulation and frequency modulation are additional techniques employed in document security systems. In a screen angle modulation system, the spatial frequency of photodiode arrays of common scanners cause warning indicia printed on a second portion of the document to become visible. Any form of warning indicia or disturbance may be utilized to take the form of an obvious message, such as "void" or "false". U.S. Pat. No. 4,582,346 discloses a security document that employs the principal of screen angle modulation. Additional examples are disclosed in U.S. Pat. Nos. 5,171,040 and 5,297,815. To have an optimum effect documents employing screen angle modulation require wet offset printing with printing accuracies in the microrange.

Iridescent security devices utilize multistate optical characteristics of materials that change dramatically when they are exposed to optical radiation at preferred wavelengths. The visual effects of such changes is a change of visible color. U.S. Pat. Nos. 5,087,507 and 5,338,067 disclose dye coating systems which exhibit specific variable optical characteristics with specific reduced response times when exposed to the switching activation radiation. The visual effects of such changes is a change of visible color. For example, one color will be essentially transparent in a natural state and convert into a deep blue color when exposed to long ultraviolet or short wavelength blue radiation. The color copier or any other four color reproduction system cannot recreate the iridescent effects of a multilayer composite system that provides multistate optical density at different optical wavelengths.

A document security system, as disclosed in U.S. Pat. No. 4,420,515, which relies upon latent images on the substrate provides the document with the characteristic of a changing relationship between the contrast of the image portion with respect to the background as a function of changing of view. A latent image on a substrate is non-reproducible by an electrostatic copier. When the original is copied, the copy is black due to random diffraction of light upon activation of a photocopy light source. The light is scattered to prevent the transmission of a focused reflected image to the copier drum.

U.S. Pat. No. 4,303,307 discloses a security document that copies black by providing a paper substrate including a dielectric layer formed of an electrically non-conducting material. A plurality of electrically conducting reflective spherical particles are embedded within the dielectric layer. The particles scatter the incident light and divert the transmission of reflective light away from the receiving elements of a 0/45° specular illumination-type photocopier. Thus, the photocopying process is corrupted by dispersing the light in a pattern to prevent the transmission of a focused, reflected image to the photocopier drum. Light incident from the illuminating lamp of the copier is directed away from rather than toward the copier drum, preventing copying of the original document.

While there are many known security methods and devices for preventing the unauthorized photocopying of documents, as well as forging and counterfeiting negotiable instruments, the known devices and methods are produced by techniques that require advanced technology at a considerable expense. The security devices are limited in use, such as holograms on credit cards or drivers licenses or the incorporation of optically variable devices in currency and other negotiable instruments. Most of the optically variable devices described above are prepared by laminating a number of different materials to a substrate. The manufacturing processes are cost prohibitive for conventional commercial use and are not compatible with conventional printing techniques such as lithography, dry litho, laser printers, bubble jet printers, ink jet printers, electrostatic toner printers or halftones using commercially available printing inks. Therefore, there is need for a security document that is applicable to a wide variety of uses and inhibits the generation of copies by the many commercial reproduction devices available for both the 0/45° specular illumination type and the diffuse illumination type which include electrostatic copiers, CCD scanners, laser scanners, glow lamp scanners, cameras, enlargers, contact frames, facsimile machines and the like devices.

SUMMARY OF THE INVENTION

In accordance with the present invention there is provided sheet material resistant to photo-reproduction of indicia appearing on the material that includes a substrate having a mirrored surface. A black partially transparent diffraction grating overlies the mirrored surface. The diffraction grating is arranged in a random pattern on the surface to diffract light from the mirrored surface to prevent photo-reproduction of the indicia on the sheet material.

Accordingly, a principal object of the present invention is to provide a reflective diffraction device for producing random interference patterns that can be applied over a large area of a substrate to prevent reproduction of indicia printed on the substrate by conventional photo-reproduction processes.

Another object of the present invention is to provide a security document that utilizes a mirrored surface and first order diffraction phenomena combined with stochastic screening techniques to generate random interference patterns of light which corrupt photocopying of indicia printed on the document.

A further object of the present invention is to provide method and apparatus for inhibiting the copying of indicia and other information on sheet material by stochastically printing on a reflective surface a diffraction grating for generating random interference patterns which corrupt the photo-reproduction process.

An additional object of the present invention is to provide a reflective diffraction device that produces random interference patterns that are economically applied to a paper substrate over a large area so that information on the substrate cannot be copied utilizing conventional printing techniques.

Another object of the present invention is to provide a security document having a mirrored surface with a stochastic screen covered with a coating that enhances the legibility of indicia printed on the screen while inhibiting copy reproduction of the indicia.

These and other objects of the present invention will be more completely disclosed and described in the following specification, the accompanying drawings, and the appended claims.

DESCRIPTION OF THE PREFERRED EMBODIMENTS

Figure 1:
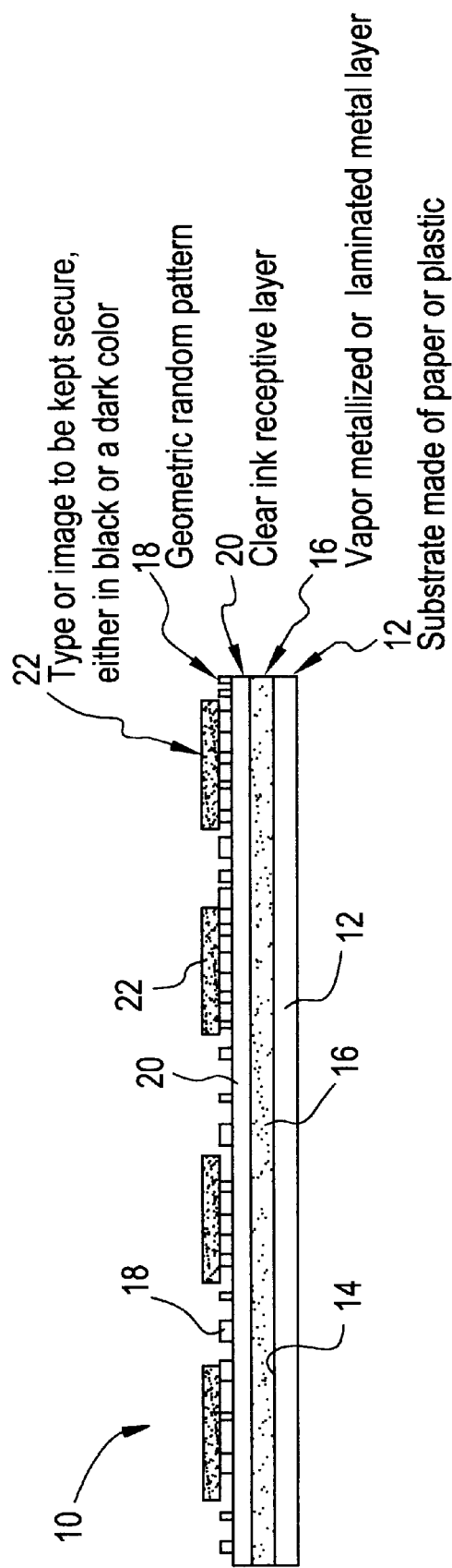
FIG. 1 is a schematic view in side elevation of a security document, illustrating a substrate covered with a metalized layer on which is printed a stochastic screen in a preselected random interference pattern for receiving information to be protected from unauthorized copying.
Figure 3:
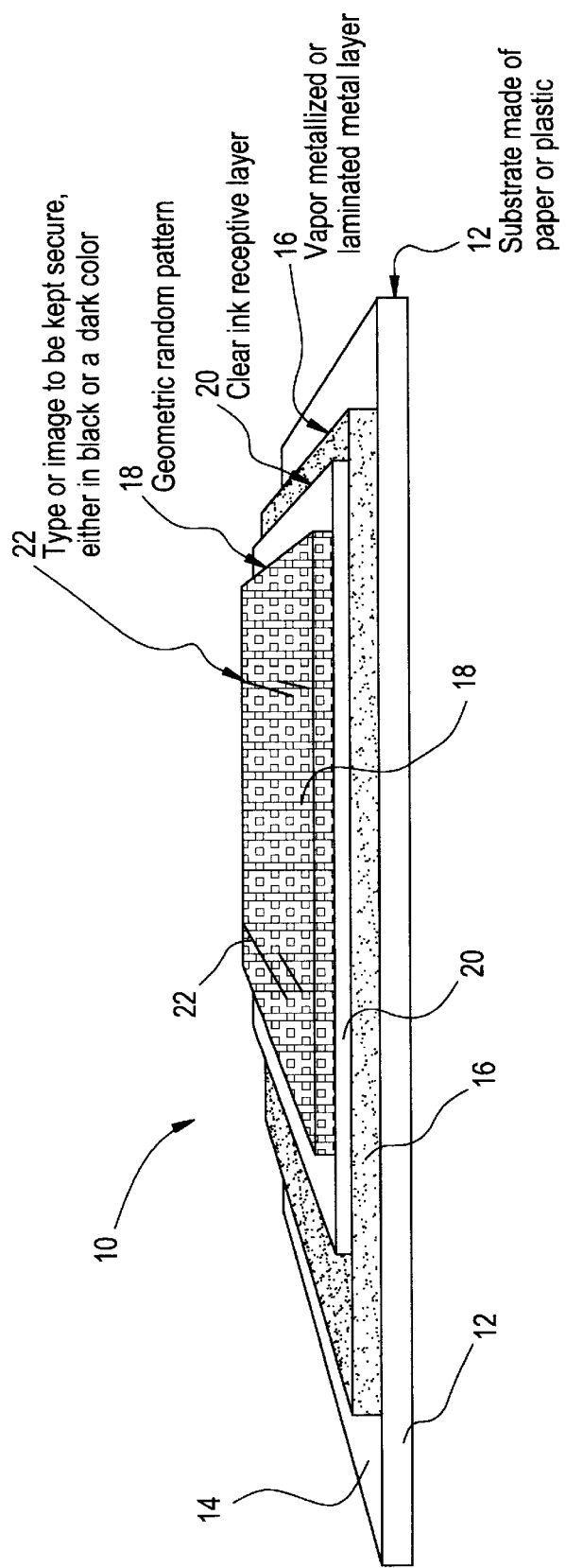
FIG. 3 is a fragmentary isometric view of the security document of the present invention, illustrating a metalalized paper substrate stochastically printed with a random patterned screen which is printed with information to be protected from unauthorized copying.
Figure 4:
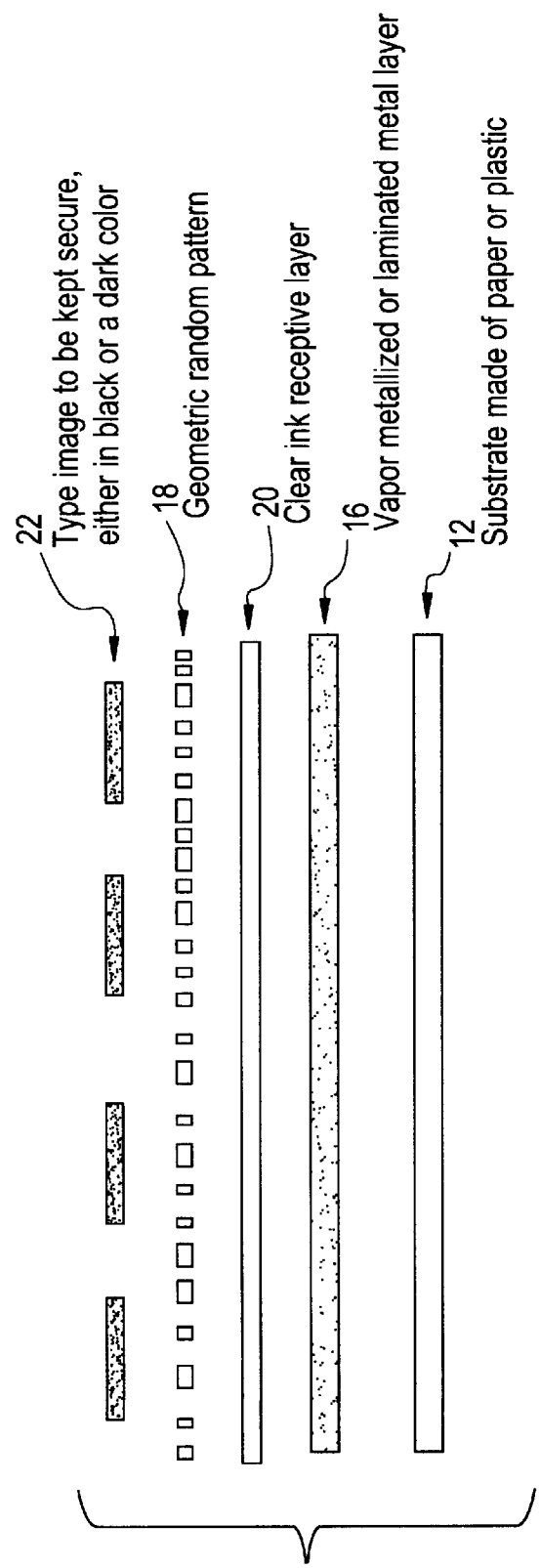
FIG. 4 is a schematic exploded view in side elevation of the security document, illustrating a lamination of materials on a metalized substrate to form a reflective diffraction device for inhibiting photocopying of indicia printed on the device.

Referring to the drawings and particularly to FIGS. 1, 3 and 4, there is illustrated a security printed document generally designated by the numeral 10 that includes a planar substrate 12 of paper, plastic or the like upon which is layered a series of materials in a laminated relationship to form a reflection diffraction device for printing with alpha-numeric indicia and other information which is not capable of being copied by conventional photo-reproduction methods. The security document 10 is capable of being printed with information but the printed information cannot be copied by either black or white or color electrostatic copiers (digital or analog) of the 0/45° specular illumination-type shown in FIG. 7 or the diffuse illumination-type shown in FIG. 8. Nor is the document 10 capable of reproduction by electronic image capture, electronic image setting devices, or by other known traditional photomechanical techniques, such as camera and photographic film or plates.

The information on the security document 10 is not capable of being reproduced by scanners or facsimile machines. Any attempt to copy the information printed on the security document 10 results in a "black" copy and the information is illegible. Thus, the information on the document 10 is photocopy resistant.

While reproduction of the information printed on the security document 10 is inhibited, the sheet material forming the document 10 can be printed by feeding through a conventional electrostatic copier, facsimile machine and the like. Thus, with the present invention the security document 10 is conventionally printed with information, but the printed information on the document cannot be reproduced.

Figure 2:
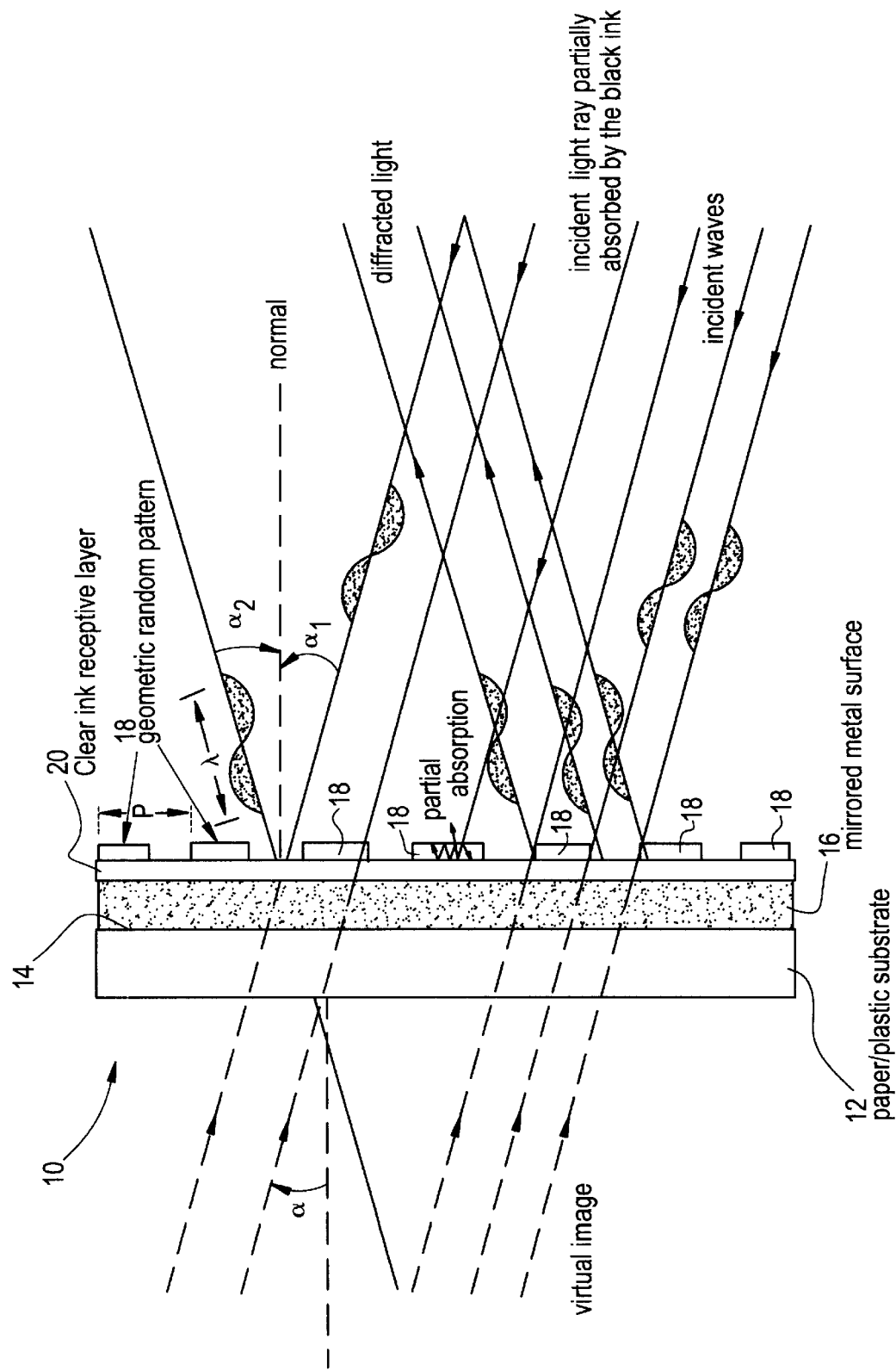
FIG. 2 is an enlarged schematic view of the security document shown in FIG. 1, illustrating a random interference pattern of diffused light created at the interface between the metalized layer and the stochastic screen on the paper substrate.

As shown in FIGS. 1 and 2 the security document 10 is, a laminated structure in which the base is a substrate 12 of paper or plastic suitable for feeding through a printing press, laser printer, or other reproduction apparatus. In one example, the substrate 12 is a sheet of paper having a conventional document size A5, 8½×11 inch and is compatible with conventional printing technologies.

A metalized layer 16 is applied to upper surface 14 of the substrate 12 by a number of conventional methods, such as vapor deposition or laminating a metal sheet to the upper surface 14. The metalized layer 16 also includes a metal foil applied to the substrate surface 14. In addition, the metalized layer 16 includes metalized board, foil laminated board, foil stamping, metalized plastic sheet, and foil laminated sheet. The metal can be selected from a group that includes aluminum, brass, gold, silver, copper, nickel, platinum, or rhodium. Generally, any metal can be utilized that provides a specular surface on the paper substrate 12. Preferably, the metalized layer 16 covers the entire upper surface 14 of the paper substrate 12. Thus, the metalized layer 16 provides the paper substrate 12 with a mirrored surface.

It is well known that a mirror is a reflective device, and the surface of a mirror photocopies black. Documents using black ink (toner or dye) produced on a mirrored surface cannot be photocopied, faxed, scanned or photographed. However, it is well known that black text produced on a mirrored surface provides poor contrast for reading. Specular reflections from the surface inhibit its effective use as a document for reproduction by a 0/45° specular illumination-type copier; however, images on a mirrored surface can be copied by a diffuse illumination-type copier.

In accordance with the present invention, the deficiencies encountered in reading black text on a mirrored surface are overcome by stochastically printing a random geometric patterned screen 18 over the metalized layer. The screen is applied by conventional screening techniques to form a modulated random pattern of any desired geometric configuration, such as dots, random spaced parallel lines, a random cross hatching pattern, a honeycomb pattern, and the like on the metalized layer 16. To facilitate the application of the stochastic screen 18 to the metalized layer 16 a thin primer coating 20 of clear ink is applied to the layer 16. The primer coating 20 makes the metalized layer 16 more ink receptive.

The stochastically printed screen 18 includes a partially transparent black screen which reduces the glare from the metalized layer 16 to provide the necessary contrast to read printed material 22 applied to the screen 18. The material 22 includes any information from alphanumeric information to graphic information.

The stochastically printed screen 18 is a black screen which acts as a partially transparent surface, i.e. it absorbs most of the incident light on the metalized layer 16. With a partially transparent black stochastically printed screen light is substantially absorbed and is not reflected. However, some light is transmitted and reflected back through the ink film, thus reducing the contrast of the black screen tint. Thus, with a partially black stochastic screen, light is reflected from the metalized layer 16 to provide the necessary contrast for reading the printed material 22. Substantially, all of the incident light is absorbed by the black screen tint or reflected by the mirror in the imaging area, thus creating a reflective diffraction grating.

The partially transparent black screen 18 provides a tinted background for the printed material 22. The partially transparent nature of the screen 18 provides the necessary contrast for the human eye to read the printed material 22 on the metalized layer 16. The partially transparent black screen is printed overlying the metalized layer 16 by conventional methods. The screen partially covers the reflective layer 16, thus forming a first order diffraction grating.

The partially transparent black stochastic screen 18 is printed with a frequency modulated random pattern of dots covering preferably 30–45% of the area of the layer 16. The dots are shown as white dots on the photo-micrograph of the film in FIG. 5. The dots have a random size and shape characteristic of stochastic screening of the second order. The dots are printed on the metalized layer 16 at a selected dot per inch (dpi) spatial frequency.

Preferably the dots are printed at a minimum of 2400 dpi having a pixel size no greater than 21 microns at a grating repeat distance on the order of 25 microns or less. It should be understood that other random patterns of geometric shapes can be used to construct the frequency modulated screen 18. Geometric patterns formed of parallel lines, cross hatching, honeycomb design and the like are applicable for the screen 18 which is not limited to dots.

The stochastically printed screen 18 on the metalized layer 16 forms a reflective diffraction grating that produces random interference patterns of light at the interface between the screen 18 and the reflective layer 16. The random interference pattern extends over the entire metalized layer 16.

The reflective diffraction grating has the effect, as illustrated in FIG. 2, of interrupting incoming light waves, for example from the light source of an electrostatic copier of the 0/45° specular and diffuse types. The grating functions as a series of randomly spaced point light sources that interact to produce constructive and destructive interference patterns. In effect, the light from the photocopier is scattered to prevent the transmission of a focused reflected image to the copier drum. The operation of a conventional electrostatic copier is beyond the scope of the present invention. U.S. Pat. No. 4,303,307 schematically illustrates and discloses an electrostatic copier and is incorporated herein by reference.

Figure 5:
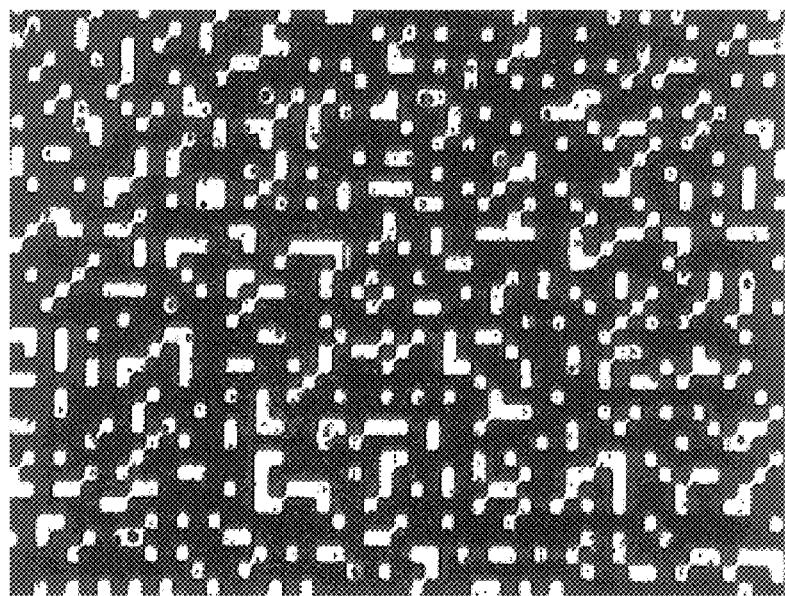
FIG. 5 is a photo-micrograph of a film negative showing the stochastically screened dots to be printed on the metalized substrate of the present invention, where the screen is formed by a dot pattern covering 30% of the area at a minimum of 2400 dot. per inch.
Figure 6:
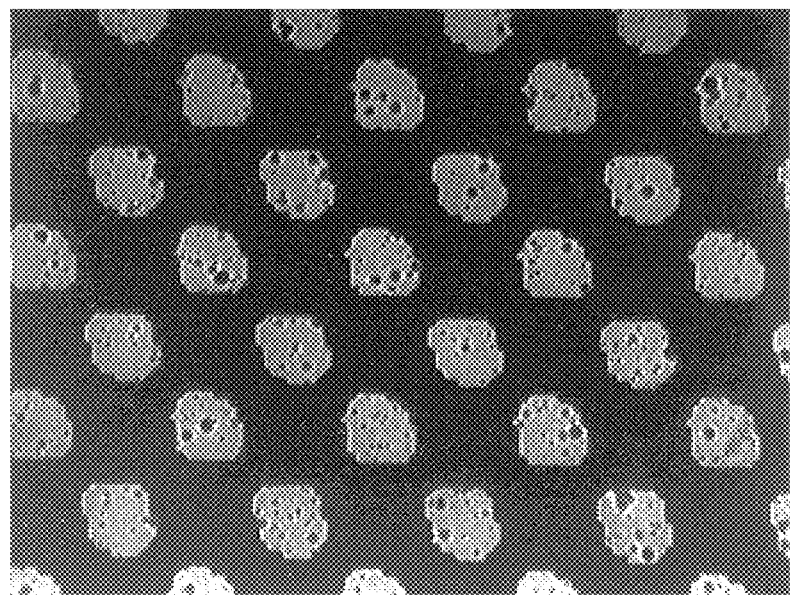
FIG. 6 is a photo-micrograph of an amplitude modulated film negative showing the screen formed by patterns of dots covering a 30% area at 150 lines per inch.

Referring to FIG. 5 there is illustrated a photomicrograph of the film negative which is used to expose a printing plate for stochastically printing the dot pattern on the metalized layer 16. The film is used to make the black printing plates. The printed screen covers, for example, 30% of the metalized layer 16 having a print pattern of 2400 dpi for dots having a pixel size of 21 microns. FIG. 6 is another photo-micrograph of the film used to form a partially transparent black periodic printed screen. The amplitude modulated dot pattern obtained from the film shown in FIG. 6 covers 30% of the metalized substrate 12. This periodic amplitude modulated pattern is generated at 150 lines per inch.

The screen pattern obtained from the film shown in FIG. 6 forms a diffraction grating that produces a cluster of symmetrically and periodically repeating point light sources. The grating when illuminated from the light source of a copier creates a periodic interference pattern that prevents the material printed on the screen 18 from being copied. The capability to inhibit photocopying is also determined in part on the scanning frequency of the copier. The random interference pattern formed by the screen has the effect of removing the scanning frequency of the copier from application. The scattered light generated by the random reflective diffraction grating of the screen corrupts the copy so that it is illegible.

The random interference pattern of light created by the reflective diffraction grating depends upon the wavelength difference between the light rays incident upon the security document 10 and reflected when an attempt is made to copy the material, as shown in FIG. 2. The scattering of light occurs if the difference in wavelength is a multiple of whole number wavelengths as expressed as where a is the angle of reflection, $\lambda$ is the wavelength of light, p is the repeat distance of the grating, and k is a whole integer. (See R. L. van Renesse, "Optical Security Document", ISBN 0-89006-619-1, Artech House, Boston/London 1993.)

With the stochastically printed screen 18 which is partially transparent black on the metalized substrate 12, the security document 10 is a reflective diffraction device that produces random interference patterns of diffracted light. The diffracted light utilizes both reflective and first order diffraction phenomena. The result is that 12 point type and less is rendered illegible on either a black and white or color photocopier.

If it is desired to use a stochastic printed screen having a randomly modulated spatial pattern that covers less than 30% of the substrate area or uses a contrast setting higher than normal or a reproduction size larger than the original copy or a size larger than 12 point type, then the geometric pattern, such as dots per inch, of the screen tint is increased proportionally. Correspondingly, the pixel size of the dots are decreased. This provides a printable surface having the requisite contrast for reading by the human eye but resistant to photocopying.

In one example, the partially transparent black screen is printed by waterless or driographic printing. In addition, conventional offset processes can be used, as well as UV printing, gravure, screen, flexo UV, or by other processes that produce an a partially transparent black screen pattern having the desired resolution.

Figure 7:
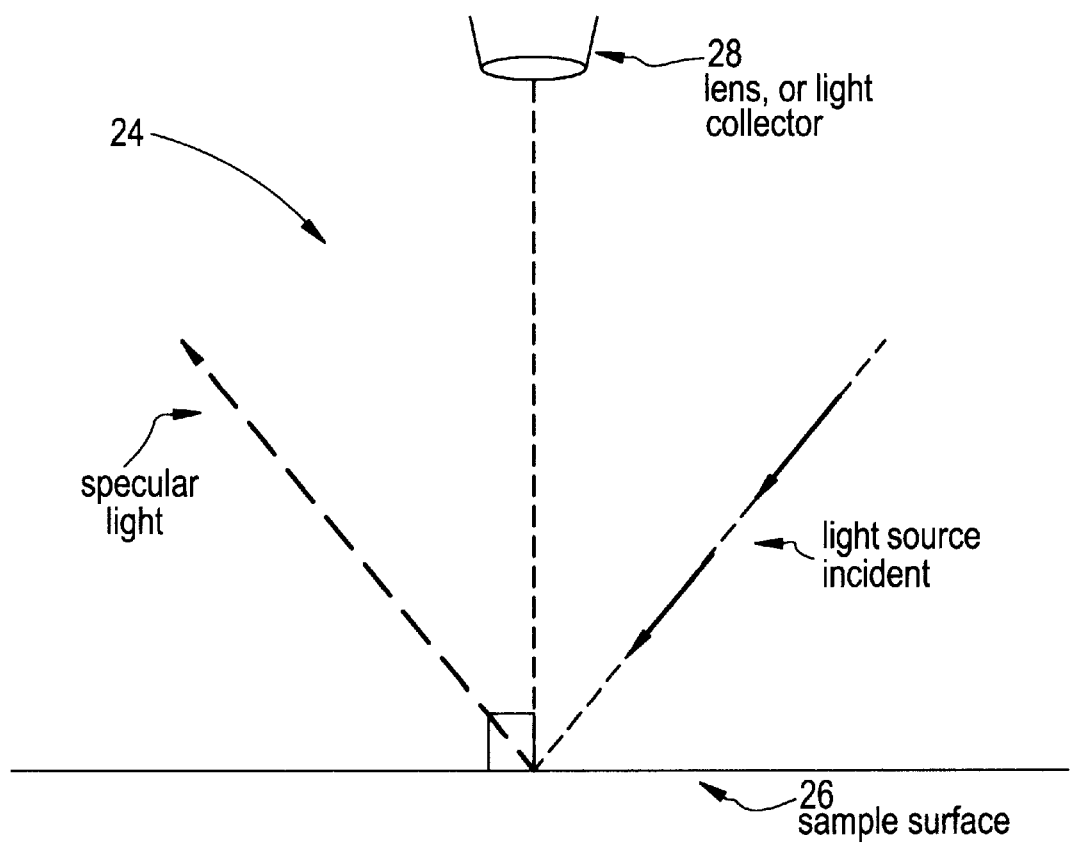
FIG. 7 is a schematic illustration of a 0/45° specular illumination-type photocopier for which the present invention corrupts copies.
Figure 8:
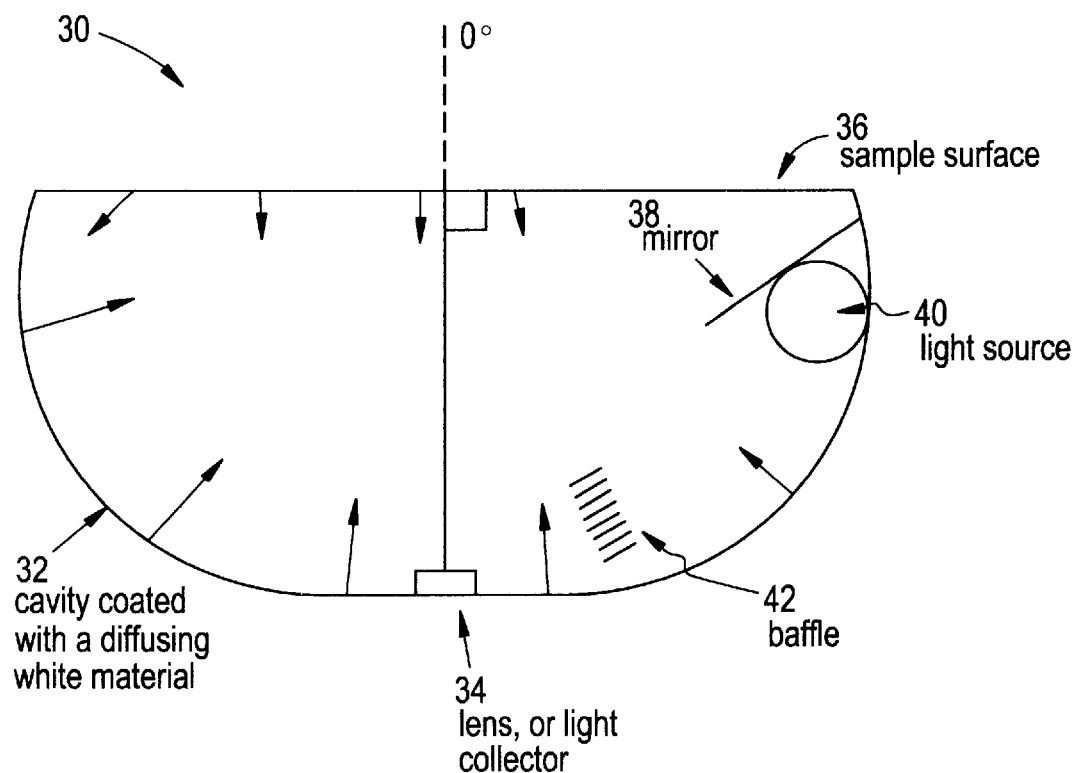
FIG. 8 is a schematic illustration of a diffuse illumination-type photocopier for which the present invention corrupts copies.

The metalized layer 16 on the paper substrate 12 alone functions as a copy deterrent but only on a specularly illuminated copier as shown in FIG. 7. A specularly illuminated copier generally designated by the numeral 24 is shown in FIG. 7. Incident light from a source strikes sample surface 26 at 45° and specular light is transmitted from surface 26 at 45°. A lens or light collector 28 is aligned perpendicular to the surface 26.

With the present invention the stochastic screen 18 reduces the glare from the metalized surface 16 and provides the requisite contrast for reading the security document 10 printed with information. The screen 18 serves as a copy inhibitor for both the specularly illuminated copier 24 shown in FIG. 7 and a diffuse illuminated-type copier generally designated by the numeral 30 in FIG. 8. The diffuse illuminated copier 30 includes a concave cavity 32 coated with a diffusing white material. At the bottom of the cavity 32 is positioned a lens or light collector 34. Adjacent a sample surface 36 is an angularly positioned mirror 39 and light source 40. Adjacent the lens 34 a baffle 42 is positioned in the cavity 32.

The reflective diffraction grating formed by the screen 18 on the metalized layer 16 interferes with the specular light and the diffuse light cast by the copiers 24 and 26 to inhibit reproduction of the information printed on the screen 18. This is attributed to the partially transparent black screen 18 which is operable to interfere with light cast from both specular and diffuse copiers to prevent reproduction of documents by use of these types of copiers. The screen 18 is printed on the metalized substrate 12 with black ink by conventional printing and imaging processes.

In the case of diffuse copiers, the reflective diffraction grating printed with indicia must be very dark, almost black, before the indicia is inhibited from being copied. However, minimal contrast between the background and text makes the text difficult to read. Therefore, in accordance with the present invention, a matte-like surface coating is applied over the partially transparent black screen 18. With this arrangement some of the specular ambient light is diffused. Consequently, the contrast between the background and text is increased so that the printed document is more legible but still inhibited from being copied, particularly by a diffuse copier.

The matte-like coating in one embodiment is applied to the screen 18 before the printed material 22 is applied. In a second embodiment the matte-like surface coating is applied over the printed material 22 on the screen 18. In other words, the screen 27 is printed and then the matte-like surface coating is applied after the document is printed with indicia.

The matte-like coating is selected from a family of varnishes or laminates that contain finely dispersed silicates or other pigments that make the coating dull or matte-like in appearance. The coating is applied by conventionally known printing or coating processes. In the case of a laminate, the surface is modified by passing through embossing rolls or casting on a textured surface. When applied at the appropriate thickness, the document is legible but still resistant to copying. In this manner the legibility of the document is enhanced by the matte-like surface coating.

Preferably, the information to be copy protected on the document 10 is printed in black ink, but lighter colors, such as red, can be used as well. In accordance with the present invention, the security document 10 has a preselected size or shape and the material to be protected is printed by conventionally known printing technology. The security document 10 is used in the fabrication of pamphlets, books, adhesive notes, passports, event tickets, checks, deeds, titles, plastic identification badges, credit cards, drivers licenses, and many other types of publications and documents that require controlled access.

The security document of the present invention has particular application in an office environment because blank sheet material comprising the security document 10 can be readily fed through a laser printer. This allows an original security document to be printed with selected information. The information printed on the security document cannot be photocopied. In addition, an unprinted security document can be used as "copy paper" and run through a photocopy machine to be printed. The information copy printed on the security document cannot thereafter be photocopied. Thus, the stochastically screened metalized paper 12 can be fed through a photocopier, and the images produced are copy protected.

According to the provisions of the patent statutes, we have explained the principle, preferred construction, and mode of operation of our invention and have illustrated and described what we now consider to represent its best embodiments. However, it should be understood that within the scope of the appended claims, the invention may be practiced otherwise as specifically illustrated and described.

We claim:

1. Sheet material resistant to photo-reproduction of indicia appearing on the material comprising,
   a substrate having a mirrored surface,
   a black partially transparent diffraction grating overlying said mirrored surface, and
   said diffraction grating comprising a random pattern arranged on said surface to diffract light from said mirrored surface to prevent photo-reproduction of the indicia on the sheet material.

2. Sheet material resistant to photo-reproduction of indicia appearing on the material as set forth in claim 1 in which,
   said mirrored surface is a metallized layer forming a reflective surface on said substrate.

3. Sheet material resistant to photo-reproduction of indicia appearing on the material as set forth in claim 1 which includes,
   a stochastic screen printed black on said mirrored surface and partially transparent to interrupt incident light from the photo-reproduction to diffract light in a random pattern and inhibit photo-reproduction of the indicia appearing on the material.

4. Sheet material resistant to photo-reproduction of indicia appearing on the material as set forth in claim 1 in which,
   said diffraction grating is positioned on said mirrored surface in a random frequency modulated pattern to diffract light at an interface between said mirrored surface and said pattern in a random interference pattern extending over said substrate to render the indicia illegible in the photo-reproduction.

5. Sheet material resistant to photo-reproduction of indicia appearing on the material as set forth in claim 1 which includes,
   a primer coating applied to said mirrored surface, and
   said diffraction grating arranged in said random pattern on said primer coating.

6. Sheet material resistant to photo-reproduction of indicia appearing on the material as set forth in claim 1 in which,
   said diffraction grating random pattern generates random interference patterns of light reflected from said mirrored surface when illuminated with light from the photo-reproduction.

7. Sheet material resistant to photo-reproduction of indicia appearing on the material as set forth in claim 1 in which,
   said black partially transparent diffraction grating includes a stochastically printed screen formed in a random geometric pattern.

8. Sheet material resistant to photo-reproduction of indicia appearing on the material as set forth in claim 1 in which,
   said random geometric pattern of said stochastically printed screen includes dots positioned at a preselected dots per inch of a selected pixel size in a frequency modulated pattern.

9. Sheet material resistant to photo-reproduction of indicia appearing on the material as set forth in claim 8 in which,
   said dot pattern covers at least 30% of said mirrored surface.

10. Sheet material resistant to photo-reproduction of indicia appearing on the material as set forth in claim 1 in which,
    said mirrored surface includes a layer of metal applied by vapor deposition to said substrate.

11. Sheet material resistant to photo-reproduction of indicia appearing on the material as set forth in claim 1 which includes,
    a matte surface coating applied to said mirrored surface and said diffraction grating to enhance the legibility of the indicia.

12. Sheet material resistant to photo-reproduction of indicia appearing on the material as set forth in claim 1 which includes,
    a matte surface coating applied to said mirrored surface and said diffraction grating after printing indicia on said diffraction grating to enhance the legibility of the indicia.

13. A security document to prevent the photo-reproduction of information printed on a document comprising,
    a document substrate, a reflective coating applied to the surface of said substrate forming a mirrored surface on said substrate, a light absorbing screen covering said mirrored surface, said light absorbing screen forming spaced apertures on said mirrored surface, printed information applied in overlying relation to said light absorbing screen and said mirrored surface, means for covering said light absorbing screen and said mirrored surface to enhance the legibility of said printed information while rendering said printed information illegible in photo-reproduction by diffracting light from the photo-reproduction at interfaces between said light absorbing screen and said mirrored surface in a random interference pattern extending over said substrate.

14. A security document to prevent the photo-reproduction of information printed on a document as set forth in claim 13 in which, said means for covering said light absorbing screen and said mirrored surface includes a matte-like coating covering said light absorbing screen, and said information printed on said matte-like coating.

15. A security document to prevent the photo-reproduction of information printed on a document as set forth in claim 13 in which, said means for covering said light absorbing screen and said mirrored surface includes a matte-like coating applied in overlying relation to said information printed on said light absorbing screen.

16. A security document to prevent the photo-reproduction of information printed on a document as set forth in claim 13 in which, said means for covering said light absorbing screen and said mirrored surface includes a varnish containing finely dispersed silicates to create a matte-like appearance.

17. A security document to prevent the photo-reproduction of information printed on a document as set forth in claim 13 in which, said means for covering said light absorbing screen and said mirrored surface includes a laminate containing finely dispersed silicates to create a matte-like appearance.

* * * * *